United States Patent Office 3,780,146
Patented Dec. 18, 1973

3,780,146
PROCESS FOR PREPARING DI-ISOPROPYL-
PHOSPHONOMETHYL ACRYLATES OR
METHACRYLATES
Peter Gohborn, Lewiston, N.Y., assignor to Hooker
Chemical Corporation, Niagara Falls, N.Y.
No Drawing. Filed Jan. 3, 1972, Ser. No. 215,192
Int. Cl. C07f 9/40
U.S. Cl. 260—971                              10 Claims

ABSTRACT OF THE DISCLOSURE

A process is described, for the preparation of compounds of the formula

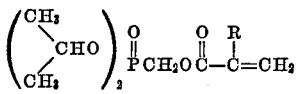

wherein R is selected from the group consisting of hydrogen and lower alkyl, which comprises (1) reacting di-isopropyl phosphite with aqueous formaldehyde, in the presence of a base, and thereafter (2) reacting the product of step (1) with an alkyl acrylate of the formula

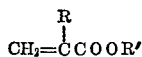

wherein R is as above described and R' is lower alkyl.

BACKGROUND OF THE INVENTION

There is a rapidly increasing demand for acrylic esters of dialkyl hydroxyalkyl phosphonates for uses as in the formation of flame-resistant plastics, coatings, leather finishes, flame retardant textile finishes, lubricating oil additives, etc.

Prior art processes for producing dialkyl phosphonoalkyl acrylates generally comprise the steps of (1) adding a dialkyl hydrogen phosphite to an aldehyde to form a crude dialkyl 1-hydroxy-alkyl phosphonate, followed by (2) reacting the latter intermediate with acrylyl or methacrylyl chloride in the presence of a hydrogen chloride acceptor such as pyridine or sodium carbonate. U.S. Pat. 3,030,347 describes a process, wherein paraformaldehyde acetaldehyde or propionaldehyde are utilized in the first reaction step to produce the intermediate dialkyl hydroxyalkyl phosphonates. Heretofore, the use of an aqueous formaldehyde solution as a reactant in the first step has been avoided by the prior art, as the reaction direction is toward the hydrolysis of the dialkyl hydrogen phosphite to form an impure, non-distillable product (Izv. Akad. Nauk. SSSR. Ser. Khim. 2551, 1967 and 1297, 1969). I have now found that di-isopropyl phosphite reacts with aqueous formaldehyde in exception to the teachings of the prior art and, further, quantitatively produces di-isophopylhydroxyalkyl phosphonates of such unexpected high purity that transesterification can be selectively employed in the second step to provide a high purity, high yield, final product. Heretofore the prior art had also avoided the utilization of a transesterification reaction in the second step of the general process, an acylation being the disclosed method of the cited reference, as transesterification of the phosphonate intermediate is non-operable with the relatively impure intermediate product of the prior art.

In this invention the pure di-isopropyl hydroxymethyl phosphonate intermediate, produced by the aqueous formaldehyde step, may be transesterified, utilizing selective catalysts, so as to again operate in exception to the general disclosure of the prior art. This lends both practical and commercial advantage over the use of paraformaldehyde and acylation as to cost and ease of handling as well as providing a difference in reactants and an unexpectedly high purity, high yield product.

Accordingly, it is an object of this invention to provide an improved process for the production of di-isopropylphosphonomethyl acrylates and methacrylates. It is also an object of this invention to provide a process for the production of highly pure di-isopropylphosphonomethyl acrylates and methacrylates. It is also an object of this invention to provide a process for the production of highly pure di-isopropylphosphonomethyl acrylates and methacrylates at high yields. A further object of the invention is to provide an efficient commercial process for the production of the afore-described acrylates and methacrylates that has a minimum of complexity thereto while producing a highly pure product in good yield. These and other objects will become apparent to one skilled in the art of the following disclosure.

DESCRIPTION OF THE INVENTION

This invention relates to an improved process for the preparation of di-isopropylphosphonomethyl acrylates of the formula

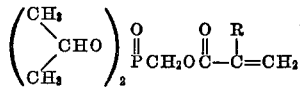

wherein R is a hydrogen atom or a lower alkyl group. More particularly, the present invention is concerned with the preparation of high purity di-isopropylphosphonomethyl acrylates in high yields by a process which comprises (1) reacting di-isopropyl phosphite with aqueous formaldehyde, in the presence of a base, and thereafter (2) reacting the product of step (1) with an alkyl acrylate of the formula

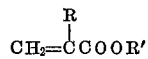

wherein R is hydrogen or lower alkyl and R' is lower alkyl.

The preferred process of the present invention is carried out in the first step by contacting di-isopropyl phosphite with aqueous formaldehyde in the presence of a base. Generally, the molar ratio of di-isopropyl phosphite to aqueous formaldehyde is about 1:1 calculated by weight formaldehyde, but this may be varied to adjust product purity. The reaction is spontaneous and exothermic and may be carried out at temperatures in the range of about 20 degrees centigrade to about 100 degrees centigrade with about 40 degrees centigrade to about 60 degrees centigrade the preferred temperature range. Temperatures lower than 20 degrees centigrade tend to slow the reaction to non-commercial rates, while temperatures in excess of 100 degrees centigrade tend to cause the promotion of undesired impurities. The aqueous formaldehyde reactant solution can be from about 10 weight percent to about 50 weight percent water, with about 30 weight percent to about 40 weight percent preferred.

During the reaction of step (1), it is preferred to use a basic catalyst to promote the reaction. Preferred basic catalysts are lower alkyl tertiary amines and metal carbonates, bicarbonates and metal alkoxides, wherein the metal is selected from groups I and II of the periodic table. Most preferred of the basic catalysts are triethylamine and alcohol solutions thereof, aqueous sodium carbonate and sodium bicarbonate solutions and alcohol solutions of sodium methoxide.

After the reaction in step (1) reaches completion, i.e. exotherm subsides, the product may be neutralized and/or stripped of water and catalyst and further may be distilled to obtain an even higher degree of purity. Distillation however, is not necessary to the continuation of the process in step (2).

The preferred process of the invention is carried out in the second step by contacting the product of step (1) with an acrylate of the formula

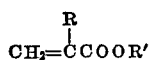

wherein R is hydrogen or lower alkyl of 1–4 carbon atoms, and R' is lower alkyl of 1 to 4 carbon atoms. Generally the molar ratio of step (1) reaction product to acrylate ranges from about 1:1 to about 1:10, with the preferred range being about 1:3 to about 1:5. The reaction may be carried out at temperatures from about 60 degrees centigrade to about 140 degrees centigrade with temperatures from about 80 degrees centigrade to about 120 degrees centigrade preferred. A catalyst is used to promote the reaction, preferred catalysts being metal alkoxides of 1–8 carbon atoms wherein the metal is selected from groups III and IV of the Periodic Table. Some preferred catalysts are tetraisopropyl titanate, tetrabutyl titanate and aluminum isopropoxide.

For best results, it is advisable to have present in the reaction mixture a polymerization inhibitor. Many such inhibitors are known, such as hydroquinone, para-methoxyphenol, para-hydroxydiphenylamine and other equivalent acrylate and methacrylate inhibitors.

After the reaction in step (2) reaches completion, i.e. exotherm subsides, the product may be neutralized and/or washed and stripped of remaining soluble impurities. The product may thereafter be distilled to obtain even greater purity.

The following examples are listed to illustrate the invention. It should be understood however that these examples are given by way of illustration and not limitation. All temperatures are in degrees centigrade and all parts are by weight, unless otherwise indicated.

Example I

To a 500 ml. round bottom flask containing 166 grams (1.0 mole) of di-isopropyl phosphite was added 79.5 g. (1.0 mole) of 37.5% aqueous formaldehyde solution. 25 ml. of 20% triethylamine in methanol was added to the reaction mixture and the ensuing reaction was maintained at 45° C., by external cooling, until completion, i.e. the exotherm had dissipated. An additional portion of 25 ml. 20% triethylamine in methanol was introduced in the reaction mixture and the solution was maintained at 45° C. by external heating, for 1.5 hours. Water was thereafter stripped from this product, benzene being added to assist in water removal by stripping off the benzene-water azeotrope. The water stripped product was thereafter distilled at 118–122° C. under a vacuum of 0.3 to 0.6 mm. mercury absolute yielding 166.4 g. of pure diisopropylhydroxymethyl phosphonate, $n_D^{25}$ 1.4285–8.

Calculated (percent): C, 42.8; H, 8.7; P, 15.8. Found (percent): C, 42.2; H, 8.5; P, 15.5.

In a similar manner, to a 500 ml. flask containing 110 grams (1.0 mole) of dimethyl phosphite was added 80 grams (1.0 mole) of 37.5% aqueous formaldehyde solution. 2.5 grams of quinoline was added to the reaction mixture, no temperature rise nor visible reaction was observed. The reaction mixture was heated to about 60° centigrade for 7 hours and thereafter stripped of water under a reduced pressure of 20 mm. mercury absolute at 70° centigrade. Benzene was added to assist in water removal by stripping off the benzene-water azeotrope. The product was thereafter analyzed by phosphorus-31 nuclear magnetic resonance spectroscopy and found to be essentially phosphorous acid in conformance with prior art expectations.

Example II

A 500 ml. round bottom flask was charged with 166 g. (1.0 mole) of di-isopropyl phosphite, 79.5 g. (1.0 mole) of 37.8% aqueous formaldehyde solution and 2 ml. of triethylamine and the reaction mixture was heated to 90° C. After 1 hour an additional 2nd triethylamine was added and after the second hour a further 2 ml. of triethylamine was added to the reaction mixture. The mixture was then heated at 90° C. for 3 hours. Water was removed by vacuum distillation at 70° C. under about 15 mm. Hg absolute to give 193 g. colorless liquid which contained 93.7% di-isopropylhydroxymethyl phosphonate and 1.8% di-isopropyl phosphite as analyzed by gas chromatography. The residue was stripped further at 100° C. under about 3 mm. Hg pressure to yield 190 g. product which contained 96.3% di-isopropylhydroxymethyl phosphonate and 0.8% di-isopropyl phosphate as assayed by gas chromatography.

Calculated (percent): C, 42.8; H, 8.7; P, 15.8. Found (percent): C, 42.6; H, 8.6; P, 15.8.

In a similar manner a 500 ml. flask is charged with 66 grams (1.0 mole) di-isopropyl phosphite and 283 grams (1.0 mole) of 10.6% aqueous formaldehyde solution. 5 milliliters of triethylamine is added to the reaction mixture which is heated at 50 degrees centigrade for 4 hours. Water is stripped from the reaction mixture at about 70 degrees centigrade under a reduced pressure of about 20 mm. mercury leaving more than about 190 grams of di-isopropylhydroxymethyl phosphonate.

Example III

A 500 ml. round bottom flask was charged with 166 g. (1.0 mole) of di-isopropyl phosphite and 79.5 (1.0 mole) of 37.8% aqueous formaldehyde solution. 10 ml. of 20% aqueous sodium carbonate solution was added to the reaction mixture and the enusing reaction was maintained, by external cooling, at about 40° C. until completion, i.e. the exotherm had been dissipated. Upon completion of the reaction, the mixture was cooled to room temperature and 5 additional ml. of 20% aqueous sodium carbonate solution was added thereto without a significant change in temperature. To insure complete reaction, the mixture was externally heated to 50° C., with constant stirring, for 3 hours. The reaction product was hereafter neutralized with HCl, filtered and stripped of water at 70° C. and 20 ml. Hg absolute to yield 193 g. of a liquid product containing 97.1% di-isopropylhydroxymethyl phosphonate as analyzed by gas chromatography. This represents a yield of 95.5% of theory.

In a similar manner a 500 ml. flask is charged with 332 grams (2.0 moles) of di-isopropyl phosphite and 121.2 grams (2.0 moles) of 49.5% aqueous formaldehyde solution. 5 milliliters of 20% aqeuous sodium carbonate solution is added to the reaction mixture which is heated at about 70 degrees centigrade for 3 hours. The reaction mixture is neutralized with dilute hydrochloric acid, then stripped at about 70 degrees centigrade under a reduced pressure of about 20 mm. mercury to give more than about 380 grams of di-isopropylhydroxymethyl phosphonate.

Example IV

A 500 ml. flask was charged with 166 g. (1.0 mole) of diisopropyl phosphite and 79.5 g. (1.0 mole) of 37.8% aqueous formaldehyde solution at room temperature. Three portions each containing 10 ml., 10% aqueous sodium bicarbonate solution, were added at 2 hour intervals, to the reaction mixture. Upon completion of the three additions, the reaction mixture was heated at 50° C. for 5 hours, then neutralized with dilute hydrochloric acid. Water was stripped from the neutralized solution at 70° C. and about 20 mm. Hg absolute to yield 198 g. of product. The product was dissolved in 250 ml. benzene, the solution filtered and the filtrate stripped at 70° C. under about 20 mm. Hg absolute. This product was stripped at 110° C. under 0.5 mm. Hg absolute and yielded 191 g. of liquid. Gas chromatography analysis of the residue showed, it to contain 96.1% di-isopropylhydroxymethyl phosphonate, representing a yield of 93.7% of theory.

Example V 79.5 g. (1.0 mole) of 37.8% aqueous formaldehyde solution was added to a 500 ml. round bottomed flask containing 166 g. (1.0 mole) di-isopropyl phosphite. The addition of 3 ml. of 10% weight/volume sodium methoxide in methanol to the reaction flask resulted in an exothermic reaction and the temperature of the reaction mixture rose to about 40° C. After the exotherm had dissipated, a further 3 ml. of 10% weight/volume sodium methoxide in methanol was added to the reaction mixture with a resultant increase in temperature to about 77° C. After the exotherm dissipated, a third portion of 3 ml. of 10% weight/volume sodium methoxide in methanol was added to the reaction mixture which was externally heated at 50° C. for 4.5 hours. The reaction mixture was neutralized with HCl, stripped at 70° C. under about 20 mm. Hg absolute to remove water and the reaction was dissolved in 250 ml. benzene. The benzene solution was filtered and the filtrate was stripped at 70° C., under about 20 mm. Hg absolute, to yield 194 g. colorless liquid which contained 93.0% di-isopropylhydroxymethyl phosphonate as assayed by gas chromatography, indicating a yield of 92.5% of theory.

Example VI

A one liter flask fitted with a 6" distillation column was charged with a reaction mixture comprising 196 grams (1.0 mole) of di-isopropylhydroxymethyl phosphonate of the process of Example 5, 500 grams (5.0 moles) of ethyl acrylate, 15 grams of tetraisopropyl titanate and 1 gram of para-methoxy phenol and heated to reflux (about 90° C.). Ethanol, formed by the resulting transesterification, was continuously removed from the top of the reflux column as a binary azeotrope with ethyl acrylate. 100 gram portions of ethyl acrylate were intermittently added to the reaction so as to maintain an approximate 5 moles of ethyl acrylate in the reaction mixture. The reaction was deemed completed when the ethanol distillation product was dissipated. Upon completion the reaction mixture was cooled to room temperature, dissolved in benzene and washed; first with aqueous oxalic acid solution, then sodium chloride solution and finally with water. The washed benzene/reaction mixture solution was dried over anhydrous magnesium sulfate and thereafter stripped of benzene and excess ethyl acrylate at 70° C. under 15 mm. mercury absolute to yield 225 grams of a pale yellow liquid di-isopropylphosphonomethyl acrylate analyzed as 95.1% unsaturation, representing a yield of 87.6% of theory.

Example VII

A mixture of 66 grams (2.0 moles) of 90% paraformaldehyde and 332 grams (2.0 moles) of di-isopropyl phosphite was heated with stirring at about 90 degrees centigrade for two hours, resulting in a 395 gram yield of cloudy liquid analyzing by gas chromatography as containing 43.9% di-isopropyl phosphite and 16.4% di-isopropyl hydroxymethyl phosphonate with the remainder being impurities and unreacted formaldehyde.

A one liter flask, fitted with a 6" distillation column was charged with a reaction mixture comprising 196 grams (1.0 mole) of the above cloudy liquid product, 500 grams (5 moles) of ethyl acrylate, 15 grams of tetrabutyl titanate and 2 grams of para-methoxyphenol and heated to reflux (about 90° C.). Ethanol, formed by the transesterification reaction was removed by distillation as binary azeotrope with ethyl acrylate. 200 gram portion of ethyl acrylate were intermittently added to the reaction mixture so as to maintain an approximate 5 moles of ethyl acrylate in the reaction mixture. The reaction was run for about 15 hours. Upon completion the reaction mixture was cooled to room temperature, dissolved in benzene and washed; first with aqueous oxalic acid solution, then with sodium chloride solution and finally with water, the washed benzene/reaction mixture solution was dried over anhydrous magnesium sulfate and thereafter stripped of benzene and excess ethyl acrylate at 70° C. under 15 mm. mercury absolute to yield 174.9 grams at a viscous brown liquid analyzed as 22.2% pure representing a transesterification yield of 74.1% of theory. This represents an overall process yield of 12.2% of theory.

Example VIII

A one liter flask fitted with a 6" distillation column was charged with a reaction mixture containing 392 grams (2.0 moles) di-isopropylhydroxymethyl phosphonate of the process of Example I, 1000 grams (10.0 moles) of ethyl acrylate, 25 grams of tetrabutyl titanate and 3 grams of para-methoxyphenol and treated in accordance with Example VI, with the exception that 3,000 grams of ethyl acrylate were intimately added to compensate for distillation losses. After stripping, the final product yielded 495 grams of colorless liquid di-isopropylphosphonomethyl acrylate product, analyzed as having 96.0% unsaturation representing a yield of 95.5% of theory.

Example IX

A one liter flask fitted with a 6" distillation column was charged with a reaction mixture containing 196 grams (1.0 mole) di-isopropylhydroxymethyl phosphonate of Example I, 430 grams (5.0 moles) of methyl acrylate, and 5 grams of tetrabutyl titanate and treated in accordance with Example VI. Methanol was removed from the top of the reflux column as a binary azeotrope with methyl acrylate while 10 grams of tetrabutyl titanate and 50 grams of methyl acrylate were intermittently added to the reaction mixture to compensate for distillation losses. After stripping, the final product yielded 214 grams of essentially pure di-isopropylphosphonomethyl acrylate.

Example X

A one liter flask, fitted with a 12" distillation column was charged with a reaction mixture containing 196 grams (1.0 mole) of di-isopropylhydroxymethyl phosphonate, Example I, 430 grams (5.0 moles) of methyl acrylate, 8 grams of aluminum isopropoxide and 5 grams of para-hydroxydiphenylamine, and treated in accordance with Example VII with the exception that no catalyst nor methyl acrylate was added in the course of the reaction. After stripping, the final product yielded 148 grams of crude di-isopropylphosphonomethyl acrylate.

Example XI

A ½ liter flask, fitted with a 6" distillation column was charged with a reaction mixture coating 98 grams (0.5 mole) di-isopropylhydroxymethyl phosphonate of Example I, 250 grams (2.5 moles) methyl acrylate, 5 grams tetrabutyl titanate and 2.5 grams hydroquinone and treated in accordance with Example VIII. 10 grams of tetrabutyl titanate and 600 grams of methyl methacrylate were intermittently added to the reaction to compensate for distillation losses. After stripping, the final product yielded 122 grams of pale brown di-isopropylphosphonomethyl methacrylate liquid analyzed as 92.1% unsaturation, representing a yield of 85.5% of theory.

In a similar manner a one liter flask, fitted with a 6" distillation column is charged with a reaction mixture containing 98 grams (0.5 mole) of di-isopropylhydroxymethyl phosphonate of Example III, 320 grams (2.5 moles) of n-butyl acrylate, 15 grams of tetraisopropyl titanate and 2.0 grams hydroquinone and treated in accordance with Example VIII. About 850 grams of n-butyl acrylate is intermittently added to the reaction to compensate for distillation losses. After stripping, the final product yields about 101 grams of di-isopropylphosphonomethyl acrylate.

I claim:

1. A process for the preparation of compounds of the formula

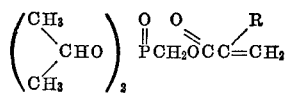

wherein R is selected from the group consisting of hydrogen and lower alkyl, which comprises (1) reacting di-isopropyl phosphite with aqueous formaldehyde, in the presence of a base, and thereafter (2) reacting the product of step (1) with an alkyl acrylate of the formula

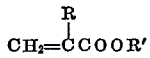

wherein R is as above described and R' is lower alkyl.

2. The process of claim 1 wherein di-isopropyl phosphite is reacted with aqueous formaldehyde in the presence of a base comprising a compound selected from the group consisting of lower alkyl tertiary amines and metal carbonates, metal bicarbonates and metal alkoxides wherein the metal is selected from Groups I and II of the Periodic Table.

3. The process of claim 2 wherein said base comprises triethylamine.

4. The process of claim 2 wherein said base comprises sodium carbonate.

5. The process of claim 2 wherein said base comprises sodium bicarbonate.

6. The process of claim 2 wherein said base comprises sodium methoxide.

7. The process of claim 1 wherein the reaction in (2) is in the presence of a catalyst comprises a metal alkoxide wherein the metal is selected from Groups III and IV of the Periodic Table.

8. The process of claim 7 wherein the metal alkoxide is selected from the group consisting of tetraisopropyl titanate, tetrabutyl titanate and aluminum isopropoxide.

9. The process of claim 1 wherein (2) is carried out in the presence of a polymerization inhibitor.

10. The process of claim 9 wherein said polymerization inhibitor comprises a compound selected from the groups consisting of hydroquinone, para-methoxyphenol and para-hydroxydiphenylamine.

References Cited
UNITED STATES PATENTS 3,030,347    4/1962    O'Brien et al. _____ 260—952 X
3,166,581    1/1965    Vegter _____ 260—952 X LEWIS GOTTS, Primary Examiner R. L. RAYMOND, Assistant Examiner U.S. Cl. X.R.
260—952, 970

PO-1050
(5/69)

UNITED STATES PATENT OFFICE
CERTIFICATE OF CORRECTION

Patent No. 3,780,146    Dated December 18, 1973

Inventor(s)    Peter Golborn

It is certified that error appears in the above-identified patent and that said Letters Patent are hereby corrected as shown below:

Column 1, inventor's name should read as follows ---Golborn---; lines 54 and 54, "di-isophopylhydroxyalkyl" should read ---di-isopropylhydroxyalkyl---. Column 5, line 14, "reaction" should read ---residue---.

Signed and sealed this 23rd day of April 1974.

(SEAL)
Attest:

EDWARD M.FLETCHER,JR.
Attesting Officer

C. MARSHALL DANN
Commissioner of Patents